Dec. 8, 1942.   W. S. EATON   2,304,446
METHOD OF AND MEANS FOR UTILIZING RECEIVED
ELECTRO-MAGNETIC ENERGIES
Filed June 5, 1940   3 Sheets-Sheet 1
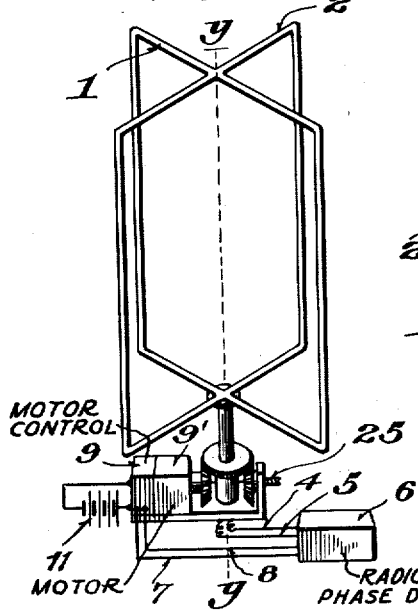
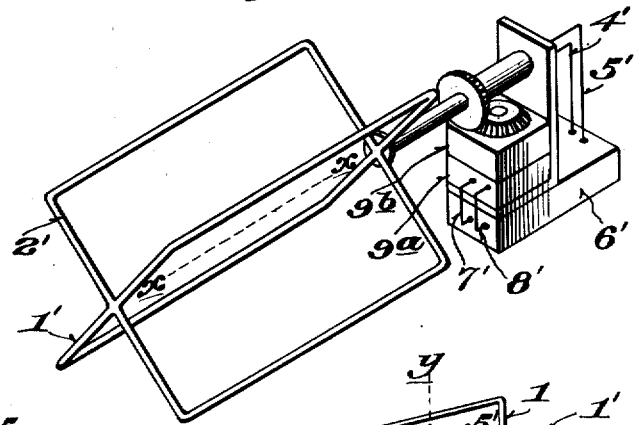
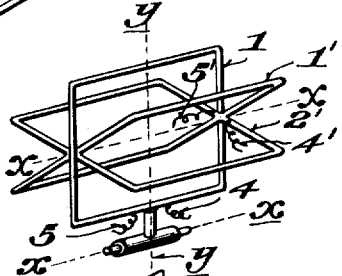
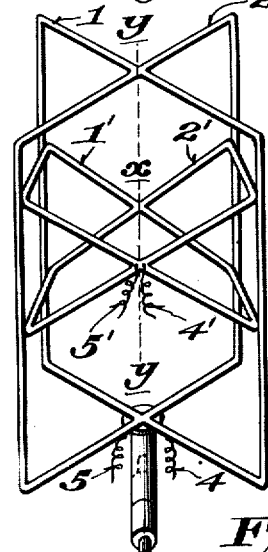
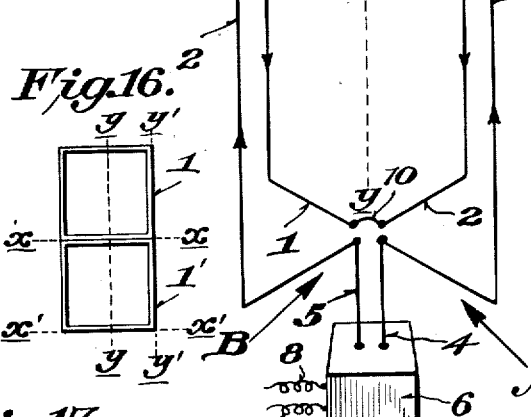
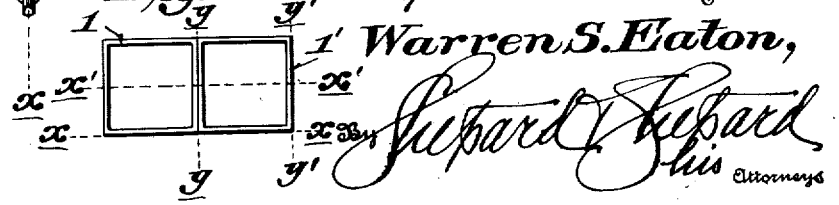
Inventor
Warren S. Eaton,
by Shepard & Shepard
his Attorneys

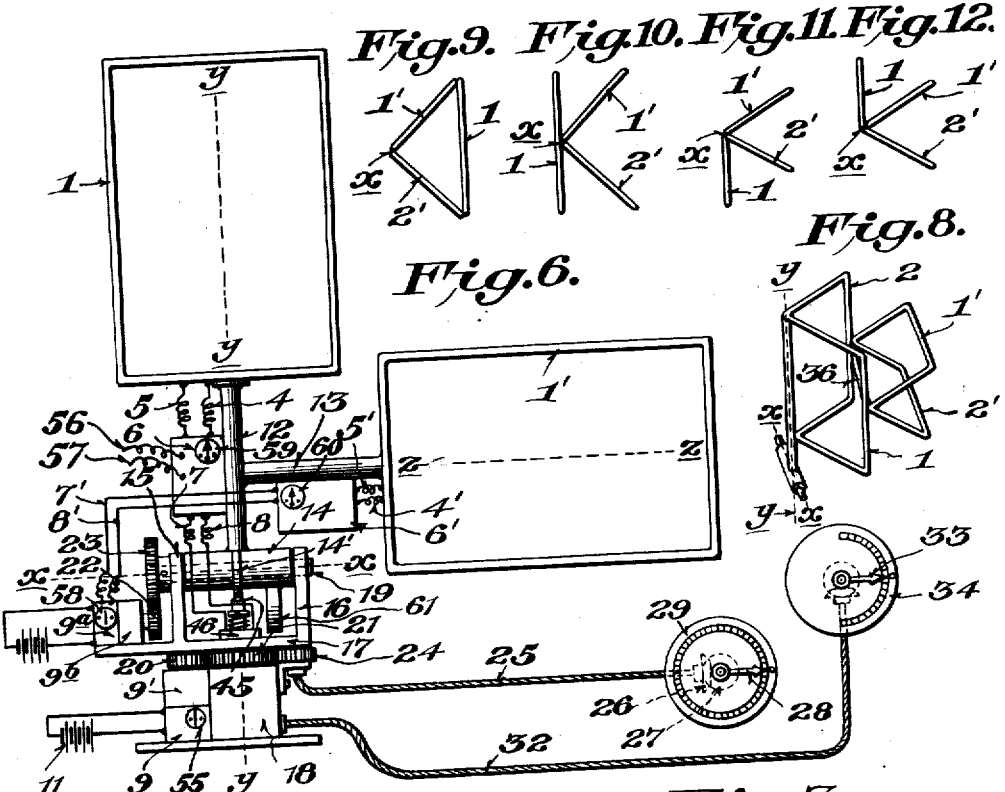

Dec. 8, 1942.  W. S. EATON  2,304,446
METHOD OF AND MEANS FOR UTILIZING RECEIVED
ELECTRO-MAGNETIC ENERGIES
Filed June 5, 1940  3 Sheets-Sheet 3
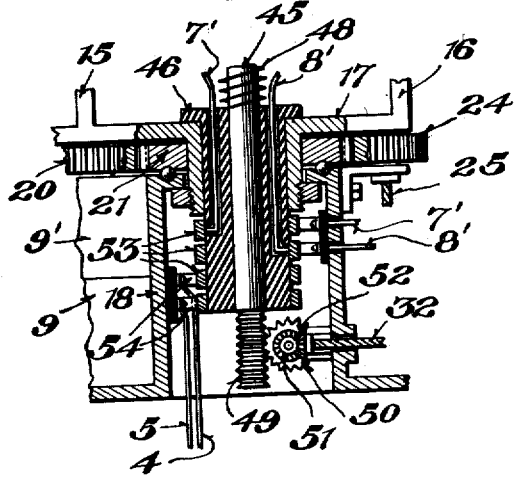
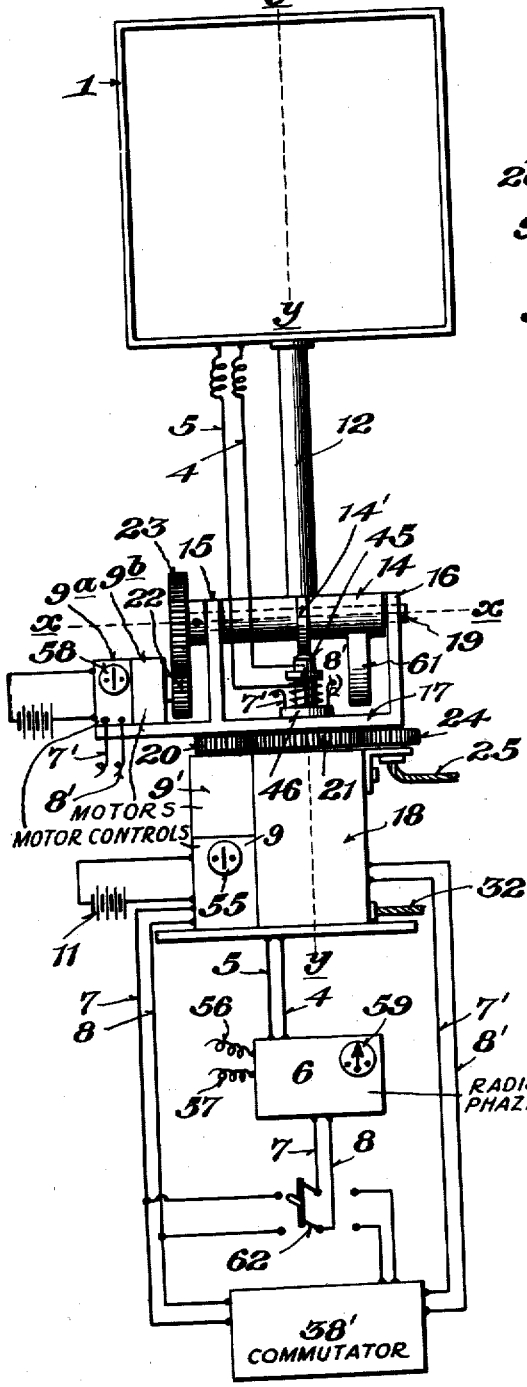
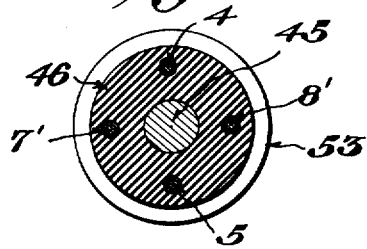
Inventor
Warren S. Eaton,
By Richard Shepard
his Attorneys Patented Dec. 8, 1942

2,304,446

UNITED STATES PATENT OFFICE 2,304,446

METHOD OF AND MEANS FOR UTILIZING RECEIVED ELECTROMAGNETIC ENERGIES

Warren S. Eaton, Los Angeles, Calif.

Application June 5, 1940, Serial No. 339,06.

16 Claims. (Cl. 250—11)

This invention relates to the reception of radiant energies, as for instance from a broadcast station, and has for its prime object the elimination of the undesired effects caused by the reception of reflected or refracted electro-magnetic energy or so-called "night effects," and is particularly designed for use in radio direction finding and/or radio compass operation to eliminate the errors caused by the reception of such energy so that true directional bearings may be taken.

The present invention may be used to provide for indicating not only the azimuthal direction to the broadcast station, but the angle of elevation of the reflected energy.

In the drawings—

Figure 1 is a perspective view of the upright antenna unit of the present invention.

Figure 2 is a diagrammatic or schematic view of the electrical or phase opposition connections of the loop circuits of Figures 1, 3, 4, 5 and 8.

Figure 3 is a perspective view of the horizontal antenna unit of the present invention.

Figure 4 is a perspective view of a combination antenna unit of the present invention made up of the combination of the upright and horizontal antenna units of Figures 1 and 3.

Figure 5 is a perspective view of a combination antenna unit showing another embodiment of the invention.

Figure 6 is an elevation of another embodiment of the invention and showing means for rotating a combination antenna on an upright axis and also on a horizontal axis, and including means for indicating the angular movement of the unit on its upright and horizontal axes.

Figure 7 is an enlarged elevation, partly in section, showing more in detail the manner of mounting the antenna unit on a base for rotation or tilting on its upright and horizontal axes and for actuating the means for indicating the angular movements of the unit.

Figure 7ª is a detail section on the line 7ª—7ª of Figure 7.

Figure 8 is a perspective view of a combination antenna unit of another embodiment of the invention.

Figures 9 to 14 inclusive are diagrammatic elevations of combination loop antenna units showing different embodiments of the present invention.

Figure 15 is a diagrammatic view showing the use of a single radio receiving and phase discriminating set.

Figures 16 and 17 are diagrammatic views of different arrangements of separate antenna members in a combination antenna unit.

Figure 18 is a diagrammatic view showing the use of a single member antenna unit as employed in the present invention.

Figure 19 is a sectional view similar to Figure 7 and showing a detail of Figure 18.

Figure 20 is a detail cross section through the bushing member shown in Figure 19.

In Figure 1, 1 and 2 designate the respective members of a pair of upright directional antennae connected in electrical or phase opposition. These antenna members may be of any desired directional type, here shown as loops disposed in angular relation and mechanically fixed together to provide a unit which is mounted to rotate on an upright axis Y—Y, shown in the drawings as being in the upright line of intersection of the planes of the loops.

The connection in electrical or phase opposition of the antenna members 1 and 2 may be as shown diagrammatically in Fig. 2, wherein 1 and 2 designate respectively the antenna members, two terminals of which are connected as at 10, and the other terminals connected by leads 4 and 5 to a radio-receiving and phase discriminating set 6. Should the antenna unit be subjected to a ground or direct wave from a broadcast station approaching in the direction A, energies will be impressed upon both antenna members 1 and 2, the greater energy being produced in antenna member 1, because the ground wave will be traveling more nearly in the direction of the plane of member 1, and, due to the phase opposition connection of the antenna members, the resultant current in the leads 4 and 5 will flow in phase direction of member 1 to set 6. Should the ground wave approach in the direction B, the direction of the resultant current in leads 4 and 5 will be in the opposite direction, i. e., in the phase direction of member 2. Should the ground wave approach the antenna unit in a direction which is at equal angles to the members thereof, equal energies will be impressed upon the antenna members, and since said members are connected in electrical or phase opposition, no current will flow in leads 4 and 5 to set 6.

The phase discriminator is employed, as for instance, as shown in Fig. 1, to selectively energize leads 7 and 8, in accordance with the phase condition in leads 4 and 5, with an electric current which is utilized to actuate suitable control means 9 for the motor 9', such that the motor will selectively rotate the antenna members 1 and 2 in one direction or the other to a position in which they will have equal energies impressed thereon, and no current will flow in the system as explained for Fig. 2, and the motor will stop with the antenna unit in its null position to the direction to the broadcast station, which direction will lie along the line bisecting the angle between antenna members 1 and 2. By properly associating a non-directional antenna with the present arrangement, azimuthal directional indications of the direction to the broadcast station will be obtained.

The current in leads 7 and 8 may be employed to actuate control means 9 such as electronic valves, relays or the like, to change over the internal connections of the motor field coils and/or armature windings of motor 9', so that said motor will be set to rotate in the necessary direction in accordance with the phase condition in leads 4 and 5, and to energize the motor itself, or cause a separate source of power such as a battery 11 to be connected to the motor to energize the same.

From the foregoing explanation, it will be understood that shifting or moving of the antenna unit about its vertical axis Y—Y to a null position with respect to a broadcast station to indicate the accurate azimuthal direction to the station is accomplished by the use of the current provided by the energy impressed by the ground or direct wave on the antenna members which as explained are connected in electrical or phase opposition.

The construction shown in Fig. 3 is the same as that shown in Fig. 1, except that the antenna unit comprising directional antenna members 1' and 2', is mounted to rotate on a horizontal axis. With this arrangement, and when the horizontal axis of rotation is at right angles to the broadcast station, the antenna members are in a null position with respect to the direct or ground wave and will be affected by reflected energy only. When the antenna members 1' and 2' receive unequally, and by reason of the phase opposition connection thereof, a current of one phase or the other will occur in the system and be conducted through leads 4' and 5' to the set 6', as disclosed in Fig. 2, and then through the leads 7' and 8' to control means 9ª and an electric motor 9ᵇ for rotating the antenna unit on its horizontal axis until the reception in the two antenna members is equal, whereupon no current will flow and the motor will be stopped with the antenna unit in its null position with respect to the reflected energy, the elevation or vertical angle of the reflected energy lying along a line bisecting the angle between antenna members 1' and 2'. Should this horizontal antenna be subjected to reflected energy at different angles from the same broadcast station, the receiving set will resolve the several energies into a single resultant energy which will actuate the motor and bring the antenna into a null position with respect to this resultant energy and therefore no current will flow through the system.

It will now be explained, reference being had to Fig. 4 of the drawings, that the directional antenna of Fig. 1, hereinafter called the upright member, may be rigidly combined mechanically with the horizontally mounted antenna of Fig. 3 into a combination unit with the axes of the unit members at right angles to one another so that the combination may not only be rotated around an upright axis Y—Y under the influence of ground or direct wave to a position null thereto, but may be tilted on a horizontal axis X—X by the action of the horizontal antenna member 1'—2' under the influence of the reflected energy to a position null thereto as explained for the construction shown in Fig. 3.

When in this tilted position, the Y—Y axis of the upright unit member, which is also the upright axis of the combination unit, will be in parallelism with the wave front of the reflected wave, and consequently the direction of the reflected energy will be along a line at right angles to the said axis Y—Y.

Since the loops of the upright antenna member of the combination unit are connected in electrical or phase opposition, and inasmuch as reflected energy is impressed equally on these loops when in this tilted position, these impressed energies will cancel one another, thereby eliminating the effects of such reflected energy or so-called "night effects," to which the loops of the upright member of the unit are subjected. It will of course be understood that leads 4 and 5 will be employed in connection with the upright antenna member 1—2, and leads 4'—5' for the horizontal antenna member 1'—2', as hereinbefore described, for the operation of electric motors or the like to effect the necessary rotation on an upright axis, as explained for Fig. 1, and the tilting of the unit on a horizontal axis, as explained for Fig. 3, and as will be more fully explained in connection with Fig. 6. This combination antenna unit will indicate by the upright antenna member when in its null position azimuthal direction to the broadcast station, and will also indicate by the horizontal member when in its null position the direction of the reflected energy from the same station. It will also be noted that the upright axis of the combination unit will also indicate the direction of the reflected energy. Any suitable or preferred mounting of the combination antenna to permit rotation on an upright axis and tilting on a horizontal axis may be employed.

In Fig. 5 of the drawings, I have shown another form of a combination antenna unit, wherein a single upright antenna member 1, for the reception of ground or direct energy of a broadcast station, is employed instead of crossed members, as in Fig. 4, and a horizontal antenna member made up of a pair of crossed antenna members 1' and 2' is employed, as in Fig. 4, for receiving reflected energy, the loops of the horizontal member being connected in electrical or phase opposition such that current impressed thereon is conducted therefrom and utilized to rotate the combination antenna unit on a horizontal axis X—X to a position null to the reflected energy in the same manner as shown in and described for Figs. 3 and 4. The phase change in received direct energy which may occur in the upright antenna member 1 is utilized to rotate the combination unit on an upright axis Y—Y to its null position with respect to the ground wave of a broadcast station in the manner hereinbefore described for Fig. 1.

In the embodiment of the invention shown in Fig. 6, I employ an upright antenna member 1 for the reception of ground or direct wave effects from a broadcast station, and also what I have termed a horizontal antenna member 1' for the purpose of receiving reflected energy. These two antenna members are in the same plane, the upright axis of the member 1 being in the line Y—Y, and the horizontal axis Z—Z of the antenna member 1' being at right angles to that of the member 1 and maintained in this relative position by suitable means, such for instance, as an arm 12 depending from the antenna member 1 and preferably disposed in the upright axis thereof and a horizontal arm 13 extending from the inner end of the antenna member 1', preferably in the axis Z—Z thereof and rigidly connected to the arm 12 at right angles thereto. The upright arm 12 is mounted for rotation on its axis in any suitable manner as by being provided at its lower end with a horizontally disposed head 14 mounted in and between bracket arms 15 and 16 rising from a bracket member 17 mounted to rotate on a pedestal base 18, the axis of rotation of the bracket 17 being in line with the upright axis Y—Y of the antenna member 1. Rotation of the bracket 17 upon its vertical axis is accomplished in the manner as will be hereinafter described.

The combination antenna member is also mounted to rotate about the horizontal axis X—X and this may be accomplished by providing the head 14 at each end with a trunnion 19 rotatably mounted in the adjacent bracket arm 15 or 16. Rotation of the combination antenna unit on the axis X—X will be as hereinafter described.

For the purpose of rotating the combination antenna unit about the upright axis Y—Y, current is conducted between the upright antenna member 1 and the receiving and phase discriminating set 6 by leads 4 and 5. Current is conducted from the set 6 through leads 7 and 8 and downwardly through the bracket 17 and the pedestal base 18 to suitable control means 9 for actuating the motor 9' as hereinbefore described. This motor may be provided with a gear 20 meshing with a gear 21 carried by the underside of the bracket 17 and mounted in a bearing on the top of the pedestal base 18 with its axis of rotation in the axis Y—Y, whereby operation of the motor 9' will, through the meshed gears 20 and 21 produce a rotation of the bracket 17 around this axis, which will in turn rotate the upright antenna 1 about its upright axis and swing the antenna member 1' in a substantially horizontal direction around the said axis.

For effecting rotation of the combination antenna unit about the horizontal axis X—X, current is conducted from the horizontal antenna member 1' through the leads 4' and 5' to the phase discriminating and receiving set 6', from which current is taken through the leads 7' and 8' to a controller 9ª for actuation of a motor 9ᵇ, the latter being provided with a gear 22 in mesh with a gear 23 carried by the adjacent journal or trunnion 19 of the head 14, whereby the latter will be rotated in its bearings in the bracket arms 15 and 16, and the entire combination antenna unit will be rotated or tilted on the horizontal axis X—X, With the construction and arrangement disclosed in Fig. 6, energy impressed upon the upright antenna member by direct or ground wave emanating from a broadcast station will energize the motor 9' so as to rotatably shift said antenna member on its upright axis Y—Y until there will be no current impressed upon the antenna member 1, whereupon the motor 9' will be stopped with the antenna member 1 in null position with respect to the ground or direct wave of the broadcast station. If the horizontal antenna member 1' is receiving reflected energy, current impressed thereon will actuate the motor 9ᵇ and rotate the antenna unit on the horizontal axis X—X until no energy will be impressed upon the horizontal antenna member 1' and the motor 9ᵇ will stop with the antenna member 1' in its null position with respect to reflected energy. Inasmuch as the unit antenna members 1 and 1' are disposed in the same upright plane, the antenna member 1 will likewise be in its null position with respect to reflected energy, and inasmuch as it has been moved to its null position relative to the ground or direct wave from a broadcast station, neither direct nor reflected energy will be impressed upon set 6 and consequently the antenna member 1 will remain in its null position to both energies from which it will be understood that the objectionable effects of reflected energy or so-called "night effects" are eliminated.

In order to have the combination antenna unit indicate the direction to the broadcast station, the null position of the antenna unit with respect to said station is utilized in the following manner.

A gear 24 is rotatably mounted on the pedestal base 18 and in mesh with the gear 21, and from the axis of this gear, flexible shafting 25 leads to indicating mechanism. The shafting 25 may be provided with a gear 26 in mesh with a gear 27 carrying a pointer 28 and moving over a graduated dial 29. With the present apparatus mounted, for instance, on an airplane, with the zero line of the indicating dial disposed in the longitudinal axis of the airplane and with the upright antenna member 1 in its null position with respect to the broadcast station and disposed at right angles to the longitudinal axis of the airplane, the pointer 28 will be at the zero mark on the dial and will indicate the direction to the broadcast station. Should the airplane turn to the right or the left, then the upright antenna member 1 will be energized by the ground or direct wave, and through the instrumentality of the motor 9', the gear 24 will be rotated and the needle 28 will be swung away from the zero position into the direction towards the broadcast station, thereby indicating that the airplane is not traveling in the direction to the broadcast station, but at the angle thereto indicated by the needle with respect to the zero point.

In order to have the combination antenna unit indicate the angle of elevation of the reflected energy from the same broadcast station, the null position of the antenna unit member 1' with respect to said reflected energy is utilized in the following manner, as best shown in Figs. 6 and 7 of the drawings.

When the horizontal antenna member 1' has reflected energy impressed upon it, the motor 9ᵇ will be actuated as hereinbefore described and the head 14 will be tilted on its horizontal axis X—X. The head, as best shown in Figure 7ª, is provided with a cam 14' located midway between the ends of the head and disposed eccentric with respect to the longitudinal axis thereof. Disposed below the cam, in vertical alignment therewith, is an upright plunger 45 having its upper end in pressure engagement with the active edge of the cam 14' and mounted to reciprocate longitudinally through the bracket 17. A suitable bushing 46 of insulation material extends through the bracket 17 and is provided with longitudinal passages for the reception of the leads 7 and 8. The plunger 45 is provided with an abutment or collar 47, against the underside of which a coil spring 48 abuts, said spring encircling the plunger 45 and bearing at its lower end against the bracket 17, specifically shown as bearing against the top of the bushing 46. The lower projecting end portion of the bushing 46 is provided with slip rings 53 to which leads 7 and 8 are connected. The motor controller 9 is provided with suitable brushes 54 engaging the slip rings 53.

The lower end portion of the plunger 45 projects below the bottom of the bushing and is provided with a rack 49 in the form of annular gear teeth which mesh with a gear 50 mounted on a suitable horizontal shaft provided with a beveled gear 51 in mesh with another beveled gear 52 from which extends flexible shafting 32 leading to an indicating mechanism including for instance, a dial 34 and a pointer 33 suitably geared to the flexible shafting.

With the present apparatus mounted, for instance, on an airplane, and with the horizontal antenna member 1' in its null position with respect to the reflected energy, the pointer 33 will have been moved from the zero mark on the dial 34 to a position which will indicate the angle of elevation of the reflected energy, because the reflected energy impressed on the horizontal antenna member 1' has actuated the motor 9b to tilt the horizontal antenna member 1' into its null position with respect to reflected energy. It will here be noted that the upright antenna member 1, which lies in the same plane with the horizontal antenna member 1' will of course have been moved into its null position with respect to reflected energy and thus the objectionable effects of reflected energy or so-called "night effects," will be eliminated. While I have shown a particular indicating means, any suitable or preferred form of repeating or indicating system, mechanical or electric, may of course be employed.

Having now explained how the combination antenna unit may be caused to turn or tilt on the horizontal axis X—X, Fig. 6, which is parallel to the axis of the horizontal antenna member 1', it will be understood, with respect to Fig. 4, that the combination unit illustrated therein may be caused to turn or tilt on the horizontal axis X—X, which is at right angles to the upright axis Y—Y of the combination unit. It will also be understood by reference to Fig. 5, that the combination antenna unit illustrated therein may be caused to turn or tilt around the horizontal axis X—X which is at right angles to the upright axis Y—Y of said combination unit, rotation about the upright axis of course being effected in the manner described with respect to Fig. 6, Figs. 5 and 6 illustrating embodiments wherein a single upright antenna member is employed.

Still another embodiment of the combination antenna has been shown in Fig. 8, wherein 1 and 2 designate the upright antenna members, for receiving direct or ground wave, which, instead of being crossed as in Figs. 1 and 4, are angularly arranged in the form of a V with the members connected in electric or phase opposition and mounted to rotate about an upright axis Y—Y, as along the upright line where the members come together, and are rigidly connected. Combined with this V-shaped unit member is a horizontal unit member for subjection to reflected energy, made up of the members 1' and 2', disposed in V-shaped relation with said members rigidly connected where they come together at 36 along the horizontal axis of said horizontal unit member 1'—2'. The upright and horizontal unit members are mechanically rigidly connected at the horizontal axis 36 of the horizontal unit member, and the combination is mounted to rotate about a horizontal axis X—X which is parallel to the horizontal axis 36, in the manner indicated in Fig. 5.

Instead of employing two receiving and phase discriminating sets 6 and 6', I contemplate the use of a single set for the operation of both of the antenna unit members, as shown in Fig. 15, wherein a combination antenna unit has been indicated at 37, with leads 4 and 5 and also 4' and 5' leading to a suitable form of commutator 38. Leads 41 and 42 extend from the commutator to a single receiving and phase discriminating set 6, from which leads 39 and 40 extend back to the commutator. With current flowing from the upright antenna unit member through leads 4 and 5 to the commutator and from the latter through leads 41 and 42 to the set 6 and back to the commutator through leads 39 and 40, the latter will operate to cause the current to flow therefrom through the leads 7 and 8 to the controller and motor for rotating the combination antenna and motor for rotating the combination antenna unit about its upright axis. With current flowing from the horizontal antenna unit member through the leads 4' and 5' to the commutator 38 and therefrom through leads 41 and 42 to the set 6, through the leads 39 and 40 back to the commutator, the latter will operate to cause current to flow therefrom through leads 7' and 8' to the controller and motor for rotating the combination antenna unit about a horizontal axis, all as hereinbefore described and illustrated in Fig. 6 of the drawings. The commutating or switching means 38 may consist of oscillators and electronic valves or electrical or mechanical switching, commutating or modulating means, and may be used with any form of combination directional antenna unit.

In Figures 9 to 14, inclusive, there has been shown different combinations of upright and horizontal antenna members in combination antenna units of the present invention. The several views are elevations looking along the horizontal axis of the horizontal antenna unit member 1'—2' and in the planes of the antenna loops. It will of course be understood that each combination antenna unit will be mounted to rotate on an upright axis which may be that of the upright antenna unit member 1 or parallel thereto, and about a horizontal axis which may be that of the horizontal unit member 1'—2' as at X, or an axis parallel thereto as shown and explained for Figures 1, 3, 4, 5, 6 and 8.

While I have described an automatic rotating or tilting of the combination antenna unit on its axes, I also contemplate automatic tilting on the horizontal axis to eliminate "night effects" and manual rotation on the upright axis so that the upright antenna member may be manually adjusted to a null position or to a receiving position with respect to a broadcast station. With both antenna members null to the broadcast station and to the reflected energy therefrom, no current will flow in the system and the apparatus may be employed for direction indication as described. Also with the apparatus capable of manual adjustment on an upright axis, the upright directional antenna member may be manually adjusted to a receiving position with respect to a broadcast station, and automatically and accurately adjusted to a null position with respect to reflected energy from said station, whereby the apparatus may be employed to produce signals as the result of impressed direct or ground wave from a broadcast station and "night effects" will be eliminated from the system. To obtain these desired results, I provide for opening the circuit to the motor 9', as by means of a suitable switch 55, together with suitable leads 56 and 57 from the receiving and phase discriminating set 6 to a loud speaker, head phones or the like for producing signals.

I also contemplate manual tilting on the horizontal axis X—X, as well as on the upright axis, and to accomplish this, I may provide for opening the circuit to the motor 9ᵇ, as by means of a suitable switch 58, and the apparatus will then be in a condition for manual adjustment.

To show the null position of each of the antenna members 1 and 1', as the result of manual adjustment about each of the axes, I provide receiver 6 with a meter 59 and receiver 6' with a meter 60, so that during manual adjustment to bring the antenna members to null positions, such positions will be indicated when the meters show that no current is flowing in leads 4 and 5, and 4' and 5'.

I propose to counterbalance the apparatus on its horizontal axis X—X, as by means of a suitable counter-weight 61, here shown as on the head 14, whereby the apparatus will be balanced on the horizontal axis.

Should the apparatus be subjected to reflected energies from two sources of energy of the same frequency, and to direct energy from one of the said sources, the energy impressed by the direct energy will cause the motor 9' to be actuated and thereby shift the apparatus on the upright axis Y—Y to a position null to the said one source of direct energy, and the horizontal antenna member will receive the reflected energies from both sources, and the energies impressed by these reflected energies will resolve in the horizontal member into a resultant current which will affect the motor 9ᵇ and the latter will tilt the apparatus on the horizontal axis X—X to a position null to the resultant of the reflected energies, whereby each antenna member will be null to all of the energies.

Should the apparatus be subjected to direct energy only from one source and to reflected energy only from another source, the energies being of the same frequency, the impressed direct energy will cause the motor 9' to be actuated and thereby shift the apparatus on the upright axis Y—Y to a position null to the said direct energy, and the horizontal antenna member will receive the reflected energy from the other source and the energy impressed by said reflected energy will affect the motor 9ᵇ and the latter will tilt the apparatus on the horizontal axis X—X to a position null to the reflected energy whereby each antenna member will be null to the said energies.

Instead of employing a combination antenna unit made up of a plurality of antenna members, I may employ a single member antenna unit as disclosed in Fig. 18, wherein the reference character 1 designates a single member antenna unit mounted to rotate about an upright axis Y—Y and to tilt about a horizontal axis X—X in any suitable manner such as is shown in Fig. 6. This single member antenna unit may be carried by an upright arm 12 provided at its lower end with a crosshead 14 mounted to rotate on a horizontal axis X—X between the upstanding arms 15 and 16 of the bracket 17 which is mounted to rotate upon an upright axis on a suitable pedestal base 18, the bracket being rotatable upon its upright axis under the influence of an electric motor 9', and the head 14 being rotatable upon its horizontal axis X—X through the instrumentality of an electric motor 9ᵇ, all as hereinbefore described in detail and shown in Figs. 6 and 7. Leads 4 and 5 extend from the single member antenna unit 1 downwardly through the pedestal base 18 as shown in detail in Figures 19 and 20 of the drawings. These leads extend to a radio receiving and phase discriminating set 6 from which leads 7 and 8 extend to a commutator 38'. Leads 7 and 8 extend from the commutator to the electric motor 9'. Other leads 7' 8' extend from the commutator into the base 18 and through suitable brushes and slip rings, as shown in Figures 19 and 20, to motor 9ᵇ, for rotating the head 14 so as to tilt the single member antenna unit 1 on the horizontal axis X—X. In this embodiment of the present invention, when direct and reflected energies are being impressed upon the single member antenna unit 1, these energies will be, through the instrumentality of the commutator 38', conducted alternately to the motors 9' and 9ᵇ, and thus the single member antenna unit 1 will be shifted on the upright axis Y—Y and the horizontal axis X—X until it comes into a position null to each of the energies, when no current will flow through leads 4 and 5 and 7 and 8, and consequently the antenna unit will have been shifted to and will remain stationary in this null position.

A suitable double-pole double-throw switch 62 may be employed to open the circuit between the receiving set 6 and the commutator 38' and arranged to connect set 6 directly to motor 9' to rotate the antenna member on its upright axis only. The purpose of this switch 62 is to open the circuit to the motor 9ᵇ which tilts the antenna unit on the horizontal axis X—X, and is intended to be used for this purpose, during daytime or at such times as the apparatus is not subjected to reflected energy and tilting on the horizontal axis is not necessary.

Having described the operation of a single member antenna unit as embodied in Figure 18, it will now be understood that, by means of the switch 58, Figure 6 of the drawings, it will be understood that the circuit including leads 4' 5' and 7' 8' may be opened so that the motor 9ᵇ will not be actuated and the apparatus will not be caused to tilt on the horizontal axis X—X, but will operate as a single member antenna unit on the upright axis Y—Y under the influence of direct energy impressed upon the antenna member 1.

It will here be explained that a single antenna unit member as well as a combination antenna unit will be subject to both direct and reflected energy where both are present.

While in Figures 6, 16 and 17, the separate antenna members of the combination unit are shown in the same plane, they may be mounted with their planes parallel.

While the construction and arrangement shown in Figures 6 and 7 would limit the tilting of the antenna unit on the horizontal axes X—X, such limitation may be avoided by extending the tilting head 14 or either of its trunnions a suitable distance and transferring the upright arm 12 to a position on the extension such that neither the bracket 17 nor the pedestal base 18 will lie in the path of the arm 12, and thus the antenna unit may be turned on the horizontal axis through 360° if necessary,

What is claimed is:

1. The herein described method of indicating the direction to a source of energy by the shifting of a receptor, comprising the steps of receiving direct energy from the source on the receptor, shifting the receptor in response to the received energy until reception of direct energy thereon ceases, receiving reflected energy from the same source on said receptor, and shifting the receptor in response to received reflected energy until reception of reflected energy thereon ceases, thereby indicating by the position of the receptor the direction to the source of energy.

2. The herein described method of indicating the direction to a source of energy by the shifting of receptors, comprising the steps of receiving direct energy from the source on a receptor, shifting said receptor in response to the received energy until reception of direct energy thereon ceases, receiving reflected energy from the same source on another receptor, shifting the receptor of the reflected energy until reception of reflected energy thereon ceases, and shifting the first named receptor by the shifting of the second mentioned receptor until reception of reflected energy by the first named receptor ceases.

3. The herein described method of indicating the direction to a source of electro-magnetic energy emanating from a radio broadcast station by the shifting of a radio receptor about upright and horizontal axes, comprising the steps of receiving both direct and reflected energies from said radio broadcast station on said receptor, and shifting the said receptor about said axes in response to the energies received upon the receptor until reception of both of the energies by the receptor ceases.

4. The herein described method of indicating the azimuthal direction to a source of direct energy and the angle of elevation of the reflected energy therefrom by the shifting of a receptor, comprising the steps of receiving direct and reflected energies on said receptor, shifting the said receptor in response to the received energies until reception of both of the energies by said receptor ceases, and by said shifting indicating the azimuthal direction to the direct energy and the angle of elevation of the reflected energy.

5. The herein described method of indicating the direction to a source of energy by the shifting of receptors, comprising the steps of receiving on a receptor direct and reflected energies from a source, receiving direct and reflected energies from the same source on another receptor at an angle to the first mentioned receptor, opposing the said received energies in mutual electrical or phase opposition and thereby resolving said received energies into a single resultant current, and shifting the receptors in response to the resultant current until reception of both of the energies by the receptors ceases.

6. The herein described method of indicating the direction to a source of energy by the shifting of receptors which comprises the steps of receiving direct and reflected energies simultaneously in separate and unequal amounts on upright angularly related receptors, opposing the separately received energies in mutual electrical or phase opposition and thereby resolving said energies into a resultant current, receiving direct and reflected energies simultaneously in separate and unequal amounts on receptors angularly related about a horizontal axis, opposing the separately received direct and reflected energies in mutual electrical or phase opposition and thereby resolving said energies into a resultant current, and shifting the said receptors until reception of both of the energies on the receptors ceases.

7. The herein described method of indicating the direction to a source of energy by the shifting of receptors which comprises the steps of receiving direct and reflected energies simultaneously in separate and unequal amounts on upright angularly related receptors, opposing the separately received energies in mutual electrical or phase opposition and thereby resolving said energies into a resultant current, receiving direct and reflected energies simultaneously in separate and unequal amounts on receptors angularly related about a horizontal axis, opposing the separately received direct and reflected energies in mutual electrical or phase opposition and thereby resolving said energies into a resultant current, and in response to the said resultant currents shifting the said receptors until reception of both of the energies on the receptors ceases.

8. In an apparatus for receiving and utilizing electro-magnetic energies emanating from a radio broadcast station, the combination of receptor means for receiving both direct and reflected electro-magnet energies emanating from a radio broadcast station, said receptor means being mounted for shifting on an upright axis and on a horizontal axis, electric motors for shifting the receptor means on said axes, means for energizing said motors by energy impressed upon the receptor means to rotate the receptor means on said upright and horizontal axes until the receptor means is null to both energies.

9. In an apparatus for receiving and utilizing electro-magnetic energies emanating from a radio broadcast station, the combination of receptor means for receiving both direct and reflected electro-magnetic energies emanating from a radio broadcast station, said receptor means being mounted for shifting on an upright axis and on a horizontal axis, means for amplifying the energy impressed upon the receptor means, and individual means actuated by said amplified energy for shifting the receptor about said upright and horizontal axes until the receptor means is null to both energies.

10. In an apparatus for receiving and utilizing electro-magnetic energies emanating from a radio broadcast station, the combination of means for receiving both direct and reflected electro-magnetic energies emanating from a radio broadcast station, said means including a plurality of receptors, one or more of the receptors being disposed to receive direct electro-magnetic energy emanating from a radio broadcast station, one or more of the receptors being disposed to receive reflected electro-magnetic energy emanating from the same broadcast station, said receptor means being mounted for shifting on an upright axis and on a horizontal axis, means for amplifying the energy impressed upon the receptor means, and individual means actuated by said amplified energy for shifting the receptors about common upright and horizontal axes until the receptor means is null to both energies.

11. In an apparatus of the class described, the combination of an antenna unit comprising receptors for receiving direct and reflected energies mounted to be shifted as a unit about an upright axis and also about a horizontal axis, and means actuated by energies impressed upon said receptors for shifting the receptors as a unit on the said axes until reception thereon ceases.

12. In an apparatus of the class described, the combination of an antenna unit comprising receptors for receiving direct and reflected energies mounted to be shifted as a unit about an upright axis and also about a horizontal axis, means actuated by energies impressed upon said receptors for shifting the receptors as a unit on the said axes until reception thereon ceases, and means actuated by the movements of the receptors on said axes for indicating the directions of the respective energies.

13. In an apparatus of the class described, the combination of an antenna unit comprising receptors for receiving direct and reflected energies mounted to be shifted as a unit about an upright axis and also about a horizontal axis, electric motors for shifting the antenna unit upon said respective axes, and radio receiving and phase discriminating means electrically connected with the receptors and the electric motors for supplying current to the respective motors in accordance with the phase of the current impressed upon the respective receptors to selectively actuate the motors to shift the antenna unit on said axes until reception thereon ceases.

14. In combination, an upright directional antenna for subjection to direct or ground wave energy and mounted to be shifted about an upright axis and to be tilted about a horizontal axis, a horizontal antenna mounted to be tilted about the said horizontal axis for subjection to reflected energy from the direct or ground wave source, and means actuated by the energy impressed on the horizontal antenna by the reflected energy for rotating said horizontal antenna on said horizontal axis of rotation until reception of reflected energy thereon ceases, the two antennae being connected together to affect tilting of the upright antenna upon said horizontal axis by the tilting of said horizontal antenna on said horizontal axis until reception of reflected energy on the upright antenna ceases.

15. In combination, an upright directional antenna for subjection to direct or ground wave energy and mounted to be shifted about an upright axis and to be tilted about a horizontal axis, means actuated by the energy impressed on the said antenna by the direct or ground wave for shifting the antenna about said upright axis, a horizontal antenna mounted to be tilted about the said horizontal axis for subjection to reflected energy from the direct or ground wave source, and means actuated by the energy impressed on the horizontal antenna by the reflected energy for rotating said horizontal antenna on said horizontal axis of rotation until reception thereon ceases, the two antennae being connected together to affect tilting of the upright antenna upon said horizontal axis by the tilting of said horizontal antenna on said horizontal axis until reception of reflected energy on the upright antenna ceases.

16. In combination, a receptor for receiving direct and reflected energies mounted for shifting on an upright axis and on a horizontal axis, motors for shifting the receptor on the upright and horizontal axes respectively, a radio-receiving and phase discriminating set connected with the receptor, a commutator connected with the said set and with the motors, an electric circuit including the motors, radio receiving set and phase discriminating set and commutator and a switch for opening the circuit between the said set and the commutator and for establishing a connection between the said set and the motor for rotating the receptor only on its upright axis.

WARREN S. EATON.